United States Patent
Fan et al.

(10) Patent No.: US 9,471,846 B2
(45) Date of Patent: Oct. 18, 2016

(54) METHOD AND SYSTEM FOR VISUALIZING A CORRELATION MARK USING AN ELECTRONIC DEVICE

(71) Applicant: Xerox Corporation, Norwalk, CT (US)

(72) Inventors: Zhigang Fan, Webster, NY (US); Reiner Eschbach, Webster, NY (US); Saurabh Prabhat, Webster, NY (US); Raja Bala, Pittsford, NY (US); Edward Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/539,196

(22) Filed: Nov. 12, 2014

(65) Prior Publication Data

US 2016/0132984 A1    May 12, 2016

(51) Int. Cl.
*G06K 9/00* (2006.01)
*G06K 9/46* (2006.01)
*G06K 9/52* (2006.01)
*G06T 5/00* (2006.01)

(52) U.S. Cl.
CPC . *G06K 9/46* (2013.01); *G06K 9/52* (2013.01); *G06T 5/00* (2013.01); *G06K 2009/4666* (2013.01); *G06T 2201/0051* (2013.01)

(58) Field of Classification Search
None
See application file for complete search history.

(56) References Cited

U.S. PATENT DOCUMENTS

| | | | |
|---|---|---|---|
| 5,734,752 A | 3/1998 | Knox | |
| 5,790,703 A | 8/1998 | Wang | |
| 5,946,414 A * | 8/1999 | Cass | G06T 1/0021 382/183 |
| 6,108,512 A | 8/2000 | Hanna | |
| 6,252,971 B1 * | 6/2001 | Wang | G06T 1/0021 382/100 |
| 6,694,041 B1 * | 2/2004 | Brunk | G06T 1/0071 348/E17.003 |
| 7,126,721 B2 | 10/2006 | Wang et al. | |
| 7,301,675 B2 | 11/2007 | Wang et al. | |
| 7,352,879 B2 | 4/2008 | Wang | |
| 7,580,153 B2 | 8/2009 | Eschbach et al. | |
| 7,589,865 B2 | 9/2009 | Eschbach et al. | |
| 7,589,895 B2 | 9/2009 | Okada et al. | |
| 7,869,090 B2 | 1/2011 | Wang et al. | |
| 7,894,626 B2 | 2/2011 | Wang et al. | |
| 8,014,035 B2 * | 9/2011 | Monga | G06K 1/121 358/3.06 |
| 8,233,197 B2 | 7/2012 | Wang et al. | |
| 8,259,361 B2 | 9/2012 | Morales et al. | |
| 8,310,718 B2 | 11/2012 | Chapman et al. | |
| 8,342,576 B2 | 1/2013 | Eschbach et al. | |
| 2002/0009208 A1 * | 1/2002 | Alattar | G06F 17/30876 382/100 |
| 2002/0054355 A1 * | 5/2002 | Brunk | G06T 1/0071 358/3.28 |
| 2002/0099943 A1 * | 7/2002 | Rodriguez | G06T 1/0021 713/176 |
| 2009/0060258 A1 * | 3/2009 | Wang | G06T 1/0021 382/100 |
| 2013/0272523 A1 | 10/2013 | McCorkindale et al. | |
| 2013/0335784 A1 * | 12/2013 | Kurtz | G06K 1/121 358/3.28 |
| 2015/0083801 A1 * | 3/2015 | Soborski | G06K 19/06056 235/375 |
| 2015/0146246 A1 * | 5/2015 | Ito | H04N 1/32144 358/1.15 |

FOREIGN PATENT DOCUMENTS

EP        2230828 A2    9/2010

* cited by examiner

*Primary Examiner* — Shervin Nakhjavan
(74) *Attorney, Agent, or Firm* — Fox Rothschild LLP

(57) ABSTRACT

A mobile electronic device is used to decode a printed correlation mark. The device receives an image of a printed correlation mark, identifies a decoding template, applies the template to detect hidden content within the printed correlation mark, and outputs an image of the detected hidden content on the display. The device may enhance the image before presenting it on the display.

29 Claims, 7 Drawing Sheets

METHOD AND SYSTEM FOR VISUALIZING A CORRELATION MARK USING AN ELECTRONIC DEVICE

BACKGROUND

Security is an important requirement in many document production applications. In situations such as official or government document printing, event ticket printing, financial instrument printing and the like, many documents must be protected against copying, forging and/or counterfeiting. To do this, printed documents often include security marks that serve to prevent counterfeiting and/or identify a document as original.

A correlation mark is one example of a security mark. A correlation mark includes one or more elements that are invisible or hardly visible on a printed document. The hidden elements become visible when the document is viewed through a correlation mask that serves as a "key" to the correlation mark. An example of a correlation mark is taught in U.S. Pat. No. 5,734,752 to Knox, titled "Digital watermarking using stochastic screen." Other examples are disclosed in U.S. Pat. No. 7,894,626 to Wang et al., titled "System and method for the generation of multiple angle correlation-based digital watermarks," as well as in U.S. Pat. No. 7,894,626 to Wang et al., titled "System and method for the generation of multiple angle correlation-based digital watermarks" patterns." The disclosures of each of these references are fully incorporated herein by reference.

Although security markings such as correlation marks are effective on printed documents, they require a special device (a "screen" or "key") to decode them.

This document describes methods and systems for decoding a security mark that addresses at least some of the problems described above, and/or other problems.

SUMMARY

In an embodiment, an electronic device such as a mobile device is used to detect and display hidden content in a printed or otherwise displayed correlation mark. The device receives an image of the correlation mark, identifies a decoding template, applies the template to detect hidden content within the correlation mark, and outputs an image of the detected hidden content on a display.

When receiving the image, the device may use an image capture module (such as a camera) to capture the image. Alternatively, the device may receive the image as a data file from another source.

To identify the encoding template, the device may estimate a frequency of the correlation mark, and it may generate the decoding template using the frequency. Optionally, the device may enhance the image before presenting it on the display. Optionally, to estimate the frequency of the printed correlation mark the device may apply a two-dimensional discrete Fourier transform to the image and identify a peak location beyond a resulting main lobe of the transform as the frequency.

Optionally, to apply the template to detect hidden content, the device may high pass filter the captured image, multiply a result of the filtering by the template, repeat the multiplying any number times to yield a set of multiplied results, and select one of the multiplied results from the set as the best result. Optionally, when repeating the multiplication the device may do so on the template with a different relative shift as compared to previous instances of the multiplication.

Optionally, after applying the template, the device generating an enhanced the image of the detected hidden content. It may do so by, for example: (1) dividing the into non-overlapping blocks; (2) for each block, determining an average of an application of the template to pixels within the block; (3) assigning a value of 1 to each pixel in any block for which the determined average is positive; and (4) assigning a negative or zero value to each pixel in any block for which the determined average is negative or zero. Then, when causing the image of the detected hidden content to be presented on the display, the device may output the enhanced image.

DETAILED DESCRIPTION

Figure 1:
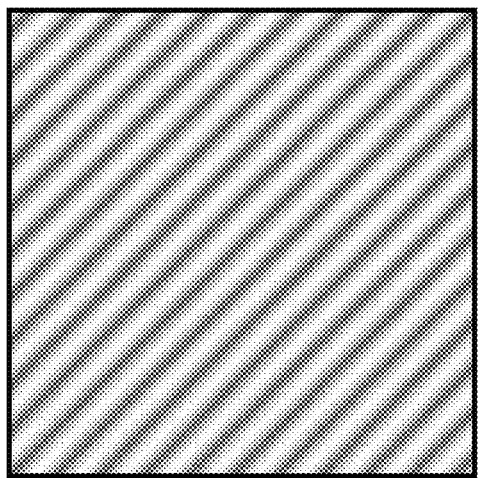
FIGS. 1 and 2 represent a top "view" and a profile "view" of a pair of conjugate line screens that a computing device may use to create a correlation mark.
Figure 1:
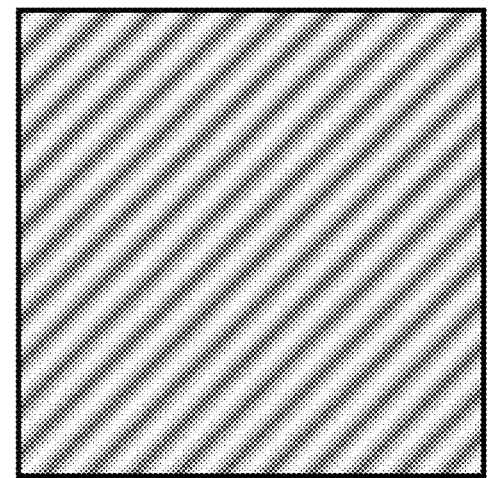

This disclosure is not limited to the particular systems, devices and methods described, as these may vary. The terminology used in the description is for the purpose of describing the particular versions or embodiments only, and is not intended to limit the scope.

As used in this document, the singular forms of any word, and defining adjectives such as "a," "an" and "the," each include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

The term "security mark" refers to a marking made on a document that can be used to verify the authenticity of the document, and thus may help prevent counterfeiting or unauthorized duplication of the document. Examples of such marks include those known as correlation marks, which will be described in more detail below.

An "electronic device" is a device that includes a processor and non-transitory computer-readable memory. The memory contains programming instructions in the form of a software application that, when executed by the processor, causes the device to perform various operations according to the programming instructions. Examples of electronic devices include computers and servers, as well as mobile electronic devices such as smartphones, personal digital assistants, cameras, tablet devices, electronic readers, media players, satellite navigation devices and the like.

An "image capture module" refers to a software application and/or an image sensor device of an electronic device that is capable of optically viewing a scene and converting an interpretation of that scene into electronic signals so that the interpretation is saved to a digital image file comprising a still image.

The terms "memory" and "computer-readable medium" each refer to a non-transitory device on which computer-readable data, programming instructions or both may be stored. Unless the context specifically states that a single device is required or that multiple devices are required, the terms "memory" and "computer-readable medium" include both the singular and plural embodiments, as well as portions of such devices such as memory sectors.

A "processor" is a component of an electronic device that executes programming instructions. The term "processor" may refer to either a single processor or to multiple processors that together implement various steps of a process. Unless the context specifically states that a single processor is required or that multiple processors are required, the term "processor" includes both the singular and plural embodiments.

A correlation mark is a security mark containing one or more elements that are invisible or hardly visible on a printed document. These hidden elements become visible when the document is viewed through a correlation mask that serves as a "key" to the correlation mark. An example of a correlation mark is taught in U.S. Pat. No. 5,734,752 to Knox, titled "Digital watermarking using stochastic screen patterns," the disclosure of which is incorporated herein by reference in its entirety. Correlation marks typically require no special materials for the printing process. A correlation mark is typically robust, and can be copied by ordinary duplication methods.

Correlation marks can be detected either by scanning or capturing an image of a document containing the mark and processing the scanned/captured image, or by overlaying a transparency containing a "key" on top of the document to reveal the hidden watermark. A pattern printed onto a transparency is an example of such a transparency, which may be referred to as a correlation mask. The pattern in the mask may be a screen, such as a stochastic screen or line screen, that corresponds to pixel elements of mark. Aligning the correlation mask to the printed document or image causes a correlation image to become visible.

To generate a correlation mark, the system may retrieve and/or print a stochastic screen pattern and/or line screen pattern for the mark that is stored in a memory. Or, the system may generate a correlation mark by producing a first screen pattern for the foreground of the mark, and a second screen pattern for the background, using methods such as those described in U.S. Pat. No. 5,734,752.

Figure 2:
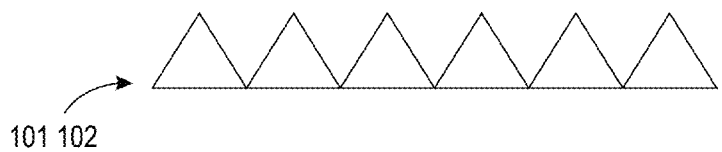

The first and second screens may be conjugate line screens that are identical except with respect to their phase. For example, FIG. 1 illustrates a pair of line screens 101, 102 that are identical except in that the lines of the second screen 102 appear in a 180 degree phase shift with respect to the lines of the first screen 101. The view of FIG. 1 is a top view of each screen. FIG. 2 provides a profile view that can correspond to either of the screens 101, 102 of FIG. 1, as both screens share the same profile but have a different phase. When an electronic device generates a correlation mark using the screens, the mark's foreground and background will have similar average color and texture patterns, but will exhibit a different phase shift in texture. Thus, any characters hidden in the resulting mark will not be readily visible without the use of a key (a decoding device that includes a stochastic screen).

Figure 3:
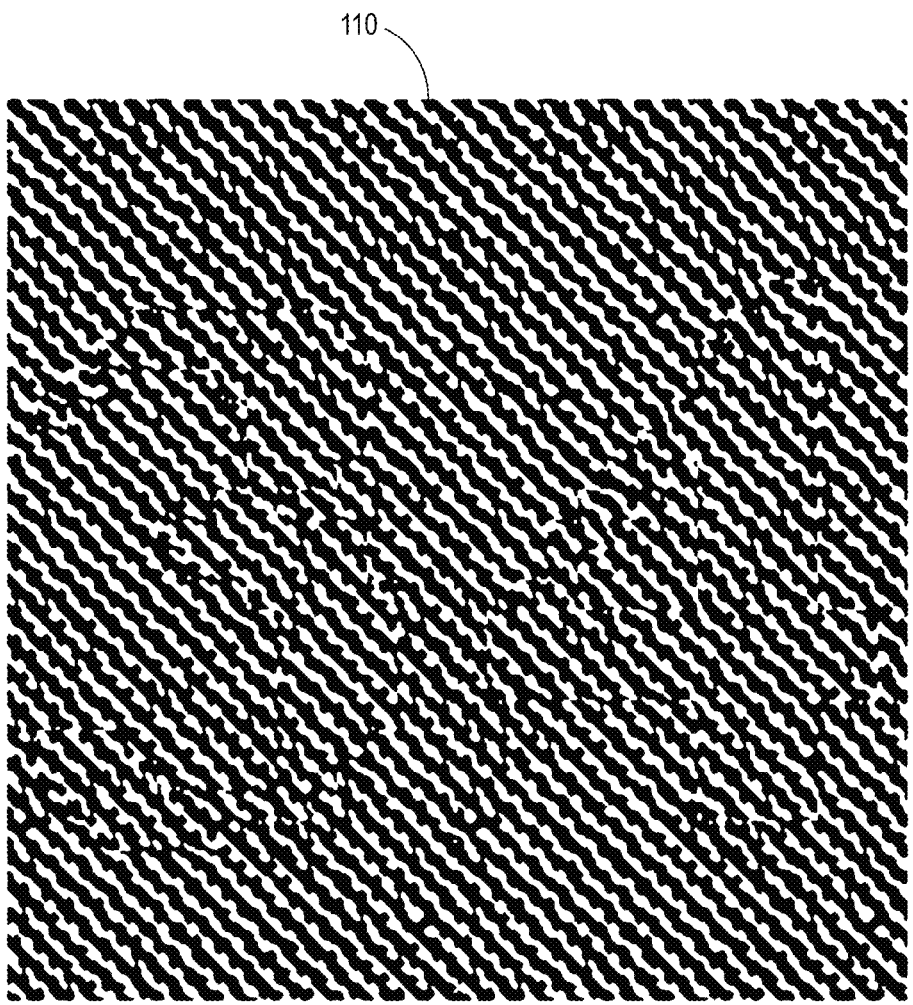
FIG. 3 is an enlarged example of a correlation mark of the prior art.

FIG. 3 shows an enlarged example of a correlation mark 110 that may be produced in accordance with the prior art. In this magnification, one who studies the mark closely may see the outlines of a mark containing the hidden characters "34." Typically, a correlation mark such as this would be printed in a small, thumbnail size (such as about ¼ inch in height). When printed at a small size, the mark will appear to the human eye as substantially a constant gray pattern, and the hidden characters will not be visible without the use of a key. Note that while the mark 110 of FIG. 3 is printed as 100% black and white for the purpose of this illustration, it may be printed in shades of gray or color.

Figure 4:
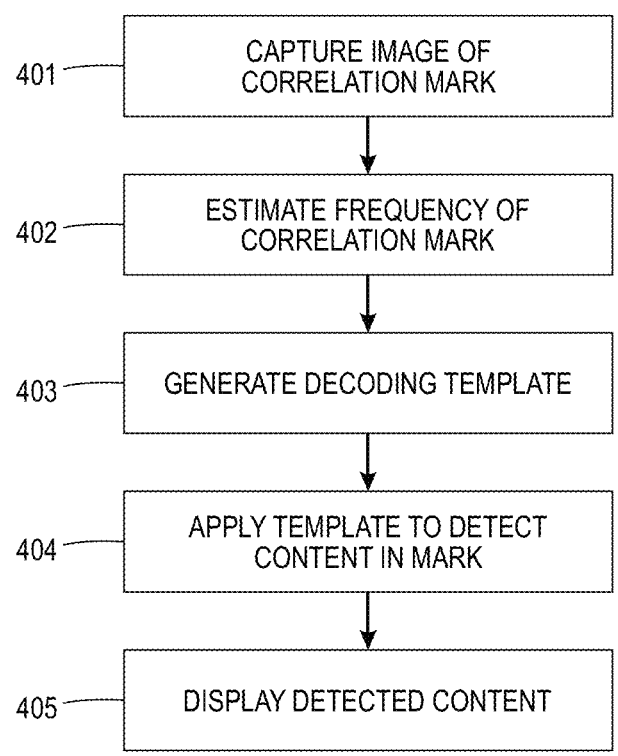
FIG. 4 is a flow diagram illustrating a process by which a mobile electronic device may decode a security mark.

FIG. 4 is a flowchart illustrating various steps that may be used to decode the mark using a portable electronic device rather than a stochastic screen. First, a user may cause the device to capture an image of a correlation mark that is printed on a substrate (step 401). The device may capture this image via the image sensing module using any suitable software application, such as a camera application, a bar-code scanning application, or a dedicated correlation mark detection application. Optionally, the device may detect a border of the correlation mark and output, via the display or audio output, a command or cue to move closer to or further away from the mark, or to adjust a position of the device so that the image is taken from directly over the mark rather than at an angle with respect to the mark. Examples of such processes and visual cues are disclosed in U.S. patent application Ser. No. 13/968,534, filed by Bala, titled "Mobile Document Capture Assist for Optimized Text Recognition," as well as in U.S. Patent Application Pub. No. 2013/0140356, filed by Fan et al., titled "Camera Positioning Tool for Symbology Reading," the disclosures of which are fully incorporated herein by reference.

By executing programming instructions, the device's processor (or a processor that receives the image from the device) may estimate a frequency of the printed correlation mark (step 402). The processor may do this using a two-dimensional Fourier method, such as those which are now or hereafter known in the art to convert spatial domain image data into the frequency domain. This process may identify an image having a set of rows and a set of columns, and it may return a two-dimensional FFT of each column in the matrix by applying a two-dimensional FFT to the image. For line screens, this may be simplified using two one-dimensional discrete Fourier transforms (DFTs), one on the vertical direction and one in the horizontal direction. The peak locations beyond the main lobe will reveal the screen frequency.

The processor may then generate a decoding template (step 403) using the estimated frequency. The template will comprise a periodic pattern that bears the same frequency as the detected screen frequency. The template may be static, or dynamic in that it changes as the screen pattern changes. For example, in some embodiments, the template may comprise a sinusoid that bears the same frequency as the detected screen frequency. Specifically, the template t(x,y) may be generated as:

$$t(x,y)=\sin[2\pi(xP_x+yP_y)],$$

where $P_x$ and $P_y$ are the x and y components of the detected screen period, respectively. The processor may then apply the template to the captured image to detect hidden content within the printed correlation mark (step 404). For example, the system may apply a template matching process by high pass filtering the captured image in the spatial or frequency domain, and then multiply the result of the filtering process by the template. The processor may shift the template any number (N) of times, each with an evenly spaced shift from 0 degrees to 180 degrees, and then repeat the multiplication. For each iteration k, $E_k$, the processor may determine the total energy of the resulting image as:

$$E_k=\Sigma f_k(x,y)^2$$

where $f_k(x, y)$ is the matching result for the $k^{th}$ iteration:

$$f_k(x, y) = i(x, y) t\left(x + \frac{kP_x}{2N}, y\right) \text{ if } T_x \neq 0$$

$$= i(x, y) t\left(x, y + \frac{kP_y}{2N}\right) \text{ if } T_x = 0$$

where $t(x, y)$ and $i(x, y)$ are the values of the template t and image i after high pass filtering, respectively. The iteration with the maximum $E_k$, may be considered the best iteration, and its result may adopted as the result for an image that displays hidden content within the correlation mark.

The brightness and contrast of the resulting image can be further examined to see if the image appears too dark or has insufficient contrast. In some embodiments, the brightness of the image may be determined as a mean, median, average or mode of each of the pixel brightness values in the image. If the image exhibits a brightness that is below a threshold or has a contrast that is below a threshold, the processor may further enhance the resulting image by dividing it into non-overlapping blocks, each covering one or more screen periods.

To perform the enhancement, for each block, the processor may determine an average of the matching result, specifically the average value of $f_{kmax}(x, y)$, where $k_{max}$ is the iteration with the maximum energy $E_k$. Then, the system may output a contrast-enhanced image by assigning a value of 1 to each pixel in a block where the matching average is positive. Otherwise, for each block having a matching average that is negative or zero, the system may set the value of each pixel in the block to zero or a negative value (e.g., −1).

Figure 5:
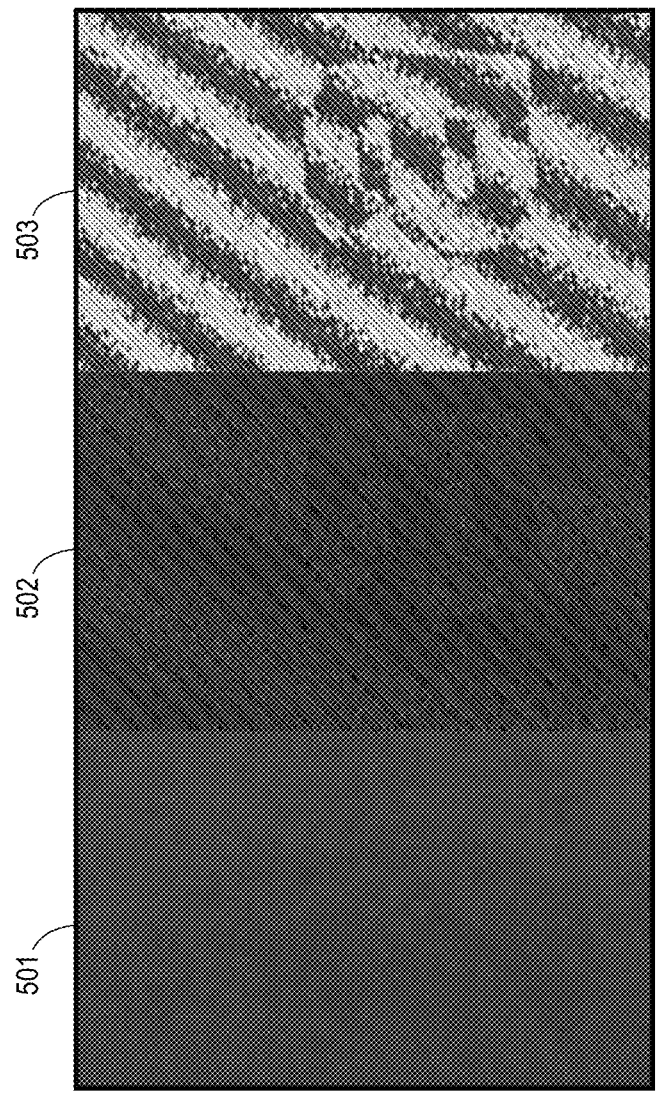
FIG. 5 illustrates an example of a decoded correlation mark as displayed on an electronic display.

Finally, the processor will cause output the detected hidden content on the display (step 405). An example of this is shown in FIG. 5, which illustrates presents a captured image 501 before the decoding process starts, a detection result after processing but before enhancement 502, and an enhanced image 503 revealing the letter "a" as hidden content.

Figure 6A:
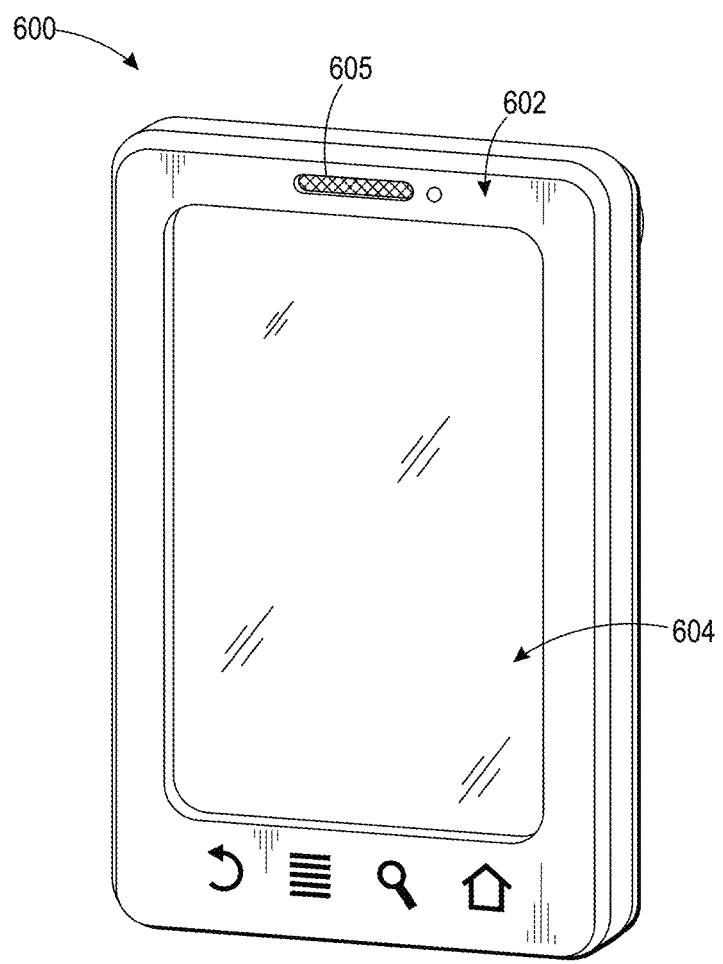
FIGS. 6A and 6B show an example of a mobile electronic device.

FIG. 6A shows a front view of an example of a mobile electronic device, generally designated 600. The mobile electronic device 600 may include a front face 602 and a display 604. The display 604 may be any suitable component for displaying images, such as, but not limited to, an electroluminescent display, electronic paper display, light emitting diode (LED) display, liquid crystal (LCD) display, plasma display panel, digital light processing (DLP) display, and organic light-emitting diode (OLED) display. The display 604 may further include a touch sensitive screen, such as, but not limited to, resistive touchscreens, capacitive touchscreens, and infrared touchscreens. The device also may include an audio output 605 such as a speaker.

Figure 6B:
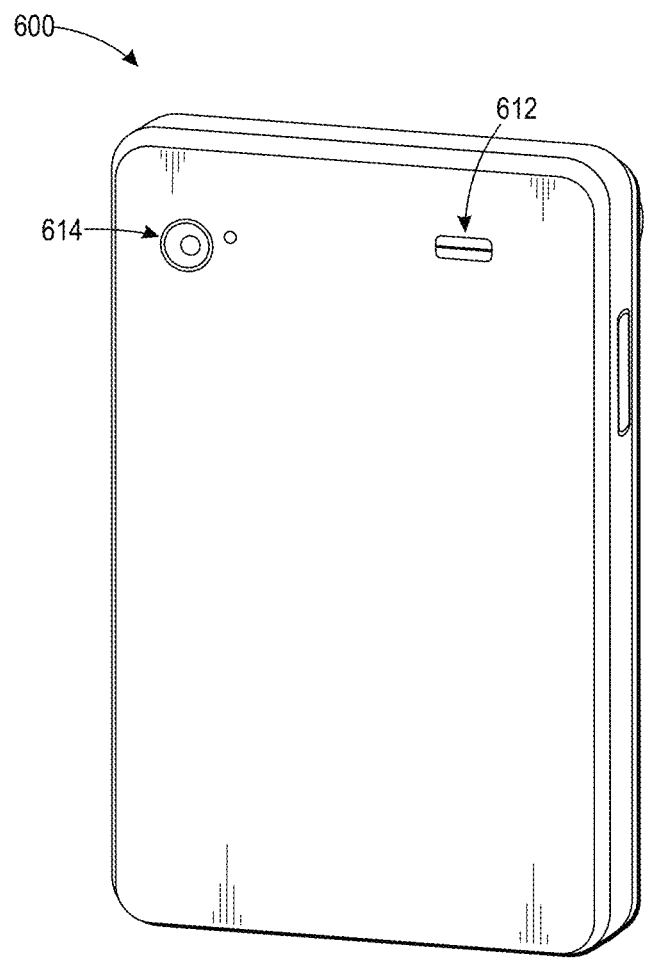

FIG. 6B shows a rear face 612 of the mobile electronic device 600. The rear face 612 may include an image capture device 614. The image capture device 614 may be any suitable component capable of receiving an optical image and transmitting the information to other components for processing.

While the image capture device 614 is depicted on the rear face of the present example, persons skilled in the art will appreciate that the image capture device 614 may be positioned at any location upon any face of the mobile device 600, or it may even be external to the mobile device 600 and connected by any means of electronic communication, such as, but not limited to, physical cable communication such as universal serial bus (USB), wireless radio communication, wireless light communication, or near field communication technology.

Figure 7:
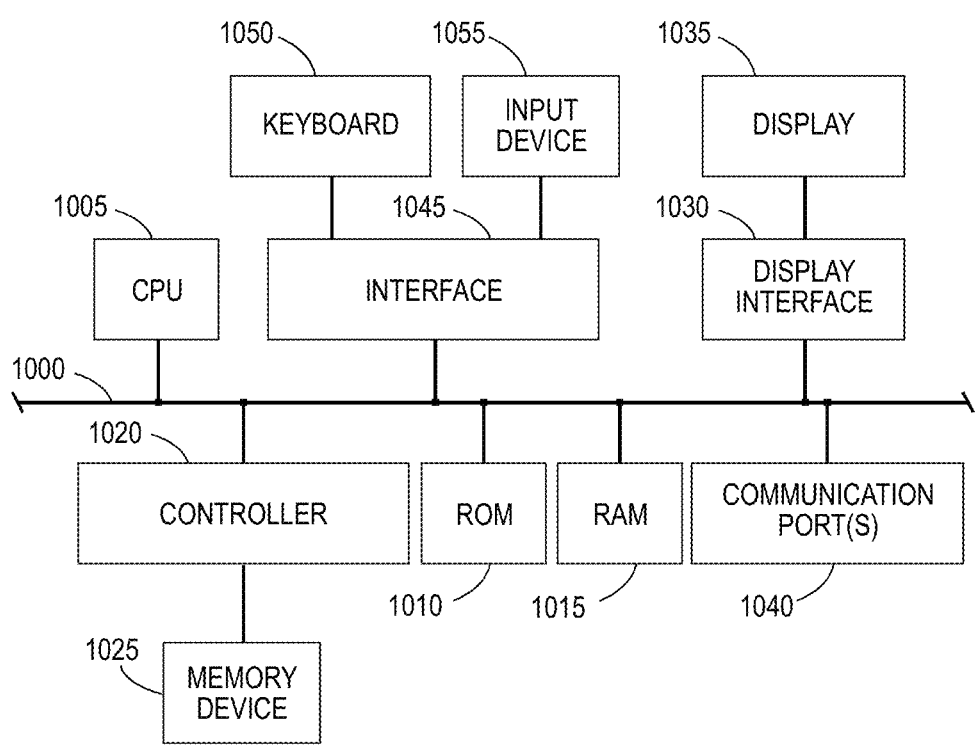
FIG. 7 is a block diagram showing various equipment that may be used to implement various embodiments of the processes described in this document.

FIG. 7 depicts a block diagram of various hardware that may be used to contain or implement the various computer processes and systems as discussed above. For example, the electronic device 600 of FIGS. 6A and 6B may contain elements such as those shown in FIG. 7. An electrical bus 1000 serves as the main information highway interconnecting the other illustrated components of the hardware. CPU 1005 is the central processing unit of the system, representing a processor (which may be a single processing device or multiple processing devices) performing calculations and logic operations required to execute a program. CPU 1005, alone or in conjunction with one or more of the other elements disclosed in FIG. 7, is a processing device, computing device or processor as such terms are used within this disclosure. Read only memory (ROM) 1010 and random access memory (RAM) 1015 constitute examples of memory devices.

A controller 1020 interfaces with one or more optional memory devices 1025 to the system bus 1000. These memory devices 1025 may include, for example, an external or internal DVD drive, a CD ROM drive, a hard drive, flash memory, a USB drive or the like. As indicated previously, these various drives and controllers are optional devices. Additionally, the memory devices 1025 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 1010 the RAM 1015, and/or any other non-transitory computer-readable medium. Optionally, the program instructions may be stored on a computer readable medium such as a compact disk, a digital disk, flash memory, a memory card, a USB drive, an optical disc storage medium, a distributed storage medium such as a cloud-based architecture, and/or other recording medium.

A display interface 1030 may permit information to be displayed on the display 1035 in audio, visual, graphic or alphanumeric format. For example, the correlation mark or decoded data discussed above may be output on the display 1035. Communication with external devices may occur using various communication ports 1040. A communication port 1040 may be attached to a communications network, such as the Internet or a local area network.

The hardware may also include an interface 1045 which allows for receipt of data from input devices such as a keyboard 1050 or other input device 1055 such as a mouse, a joystick, a touch screen, a remote control, a pointing device, a video input device and/or an audio input device. The image sensing device described in FIGS. 6A and 6B also may be an example of an input device 1055.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A mobile electronic device configured to capture and display hidden data in a correlation mark, the device comprising:
   a processor;
   a display;
   an image capture module; and
   a computer-readable memory containing programming instructions that, when executed, cause the processor to:
   receive, via the image capture module, an image of a printed correlation mark;
   identify a dynamic decoding template, wherein a frequency of the dynamic decoding template changes as the image of the printed correlation mark changes;
   apply the template to detect hidden content within the printed correlation mark; and
   output an image of the detected hidden content on the display.

2. The device of claim 1, further comprising additional programming instructions that, when executed, cause the processor to:
   estimate a frequency of the printed correlation mark; and
   to identify the decoding template, generate the decoding template using the frequency.

3. The device of claim 2, wherein the instructions to estimate a frequency of the printed correlation mark comprise instructions to:
   apply a two-dimensional discrete Fourier transform to the image; and
   identify a peak location beyond a resulting main lobe of the transform as the frequency.

4. The device of claim 1, wherein the instructions to apply the template to detect hidden content comprise instructions to:
   high pass filter the captured image and then multiply a result of the filtering by the template;
   repeat the step of multiplying the result of the filtering by the template a plurality of times to yield a plurality of multiplied results; and
   select one of the multiplied results as a best result.

5. The device of claim 4, wherein the instructions to repeat the step of multiplying the result of the filtering by the template a plurality of times to yield a plurality of multiplied results comprise, for each step of multiplying, performing the multiplying on the template with a different relative shift.

6. The device of claim 1, further comprising additional programming to, after applying the template:
   generate an enhanced image of the detected hidden content by:
   dividing the image into non-overlapping blocks,
   for each block, determining an average of an application of the template to pixels within the block,
   assigning a value of 1 to each pixel in any block for which the determined average is positive, and
   assigning a negative or zero value to each pixel in any block for which the determined average is negative or zero; and
   when outputting the image of the detected hidden content on the display, outputting the enhanced image.

7. A method of capturing and displaying hidden data in a correlation mark, the method comprising:
   by a processor of an electronic device:
   receiving an image of a correlation mark;
   identifying a dynamic decoding template, wherein a frequency of the dynamic decoding template changes as the image of the printed correlation mark changes;
   applying the template to detect hidden content within the correlation mark;
   generating an image comprising the detected hidden content; and
   causing the image with the detected hidden content to be presented on a display of the electronic device.

8. The method of claim 7, further comprising:
   by an image capture module of the electronic device, capturing the image of the printed correlation mark.

9. The method of claim 7:
   further comprising, by the processor, estimating a frequency of the correlation mark; and
   wherein identifying the decoding template comprises generating the decoding template using the frequency.

10. The method of claim 9, wherein estimating the frequency of the correlation mark comprises:
    applying a two-dimensional discrete Fourier transform to the image; and
    identifying a peak location beyond a resulting main lobe of the transform as the frequency.

11. The method of claim 7, wherein applying the template to detect hidden content comprises:
    high pass filtering the captured image:
    multiplying a result of the filtering by the template;
    repeating the multiplying a plurality of times to yield a plurality of multiplied results; and
    selecting one of the multiplied results as a best result.

12. The method of claim 11, wherein repeating the multiplying a plurality of times to yield a plurality of multiplied results comprises, for each instance of the multiplying, performing the multiplying on the template with a different relative shift.

13. The method of claim 7, further comprising, by the processor:
    after applying the template, generating an enhanced image of the detected hidden content by:
    dividing the image into non-overlapping blocks,
    for each block, determining an average of an application of the template to pixels within the block,
    assigning a value of 1 to each pixel in any block for which the determined average is positive, and
    assigning a negative or zero value to each pixel in any block for which the determined average is negative or zero; and
    when causing the image with the detected hidden content to be presented on the display, outputting the enhanced image.

14. A non-transitory computer-readable medium containing programming instructions configured to, when executed, cause a processor of an electronic device to:
    receive an image of a correlation mark;
    identify a dynamic decoding template, wherein the dynamic decoding template changes as the image of the printed correlation mark changes;
    apply the template to detect hidden content within the correlation mark;
    generate an image comprising the detected hidden content; and cause the image with the detected hidden content to be presented on a display of the electronic device.

15. The computer-readable medium of claim 14, wherein the instructions further comprise instructions to cause an image capture module of the electronic device to capture the image of the correlation mark.

16. The computer-readable medium of claim 14, wherein:
the instructions further comprise instructions to estimate a frequency of the printed correlation mark; and
the instructions to identify the decoding template comprise instructions to generate the decoding template using the frequency.

17. The computer-readable medium of claim 16, wherein the instructions to estimate the frequency of the printed correlation mark comprise instructions to:
apply a two-dimensional discrete Fourier transform to the image; and
identify a peak location beyond a resulting main lobe of the transform as the frequency.

18. The computer-readable medium of claim 14, wherein the instructions to apply the template to detect hidden content comprise instructions to:
high pass filter the captured image;
multiply a result of the filtering by the template;
repeat the multiplying a plurality of times to yield a plurality of multiplied results; and
select one of the multiplied results as a best result.

19. The computer-readable medium of claim 18, wherein the instructions to repeat the multiplying a plurality of times to yield a plurality of multiplied results comprise instructions to, for each instance of multiplying, perform the multiplying on the template with a different relative shift.

20. The computer-readable medium of claim 14, further comprising:
instructions to, after applying the template, generate an enhanced image of the detected hidden content by:
divide the image into non-overlapping blocks,
for each block, determine an average of an application of the template to pixels within the block,
assign a value of 1 to each pixel in any block for which the determined average is positive, and
assign a negative or zero value to each pixel in any block for which the determined average is negative or zero,
instructions to output the enhanced image when causing the image of the detected hidden content to be presented on the display.

21. A mobile electronic device configured to capture and display hidden data in a correlation mark, the device comprising:
a processor;
a display;
an image capture module; and
a computer-readable memory containing programming instructions that, when executed, cause the processor to:
receive, via the image capture module, an image of a printed correlation mark;
identify a decoding template;
apply the template to detect hidden content within the printed correlation mark by:
high pass filtering the captured image and then multiplying a result of the filtering by the template,
repeating the step of multiplying the result of the filtering by the template a plurality of times to yield a plurality of multiplied results, and
selecting one of the multiplied results as a best result; and
output an image of the detected hidden content on the display.

22. The device of claim 21, wherein the instructions to repeat the step of multiplying the result of the filtering by the template a plurality of times to yield a plurality of multiplied results comprise, for each step of multiplying, performing the multiplying on the template with a different relative shift.

23. A method of capturing and displaying hidden data in a correlation mark, the method comprising:
by a processor of an electronic device:
receiving an image of a correlation mark;
identifying a decoding template;
applying the template to detect hidden content within the correlation mark by:
high pass filtering the captured image,
multiplying a result of the filtering by the template,
repeating the multiplying a plurality of times to yield a plurality of multiplied results, and
selecting one of the multiplied results as a best result;
generating an image comprising the detected hidden content; and
causing the image with the detected hidden content to be presented on a display of the electronic device.

24. The method of claim 23, wherein repeating the multiplying a plurality of times to yield a plurality of multiplied results comprises, for each instance of the multiplying, performing the multiplying on the template with a different relative shift.

25. A non-transitory computer-readable medium containing programming instructions configured to, when executed, cause a processor of an electronic device to:
receive an image of a correlation mark;
identify a decoding template;
apply the template to detect hidden content within the correlation mark;
generate an image comprising the detected hidden content by:
high pass filtering the captured image,
multiplying a result of the filtering by the template,
repeat the multiplying a plurality of times to yield a plurality of multiplied results, and
selecting one of the multiplied results as a best result; and
cause the image with the detected hidden content to be presented on a display of the electronic device.

26. The computer-readable medium of claim 25, wherein the instructions to repeat the multiplying a plurality of times to yield a plurality of multiplied results comprise instructions to, for each instance of multiplying, perform the multiplying on the template with a different relative shift.

27. A mobile electronic device configured to capture and display hidden data in a correlation mark, the device comprising:
a processor;
a display;
an image capture module; and
a computer-readable memory containing programming instructions that, when executed, cause the processor to:
receive, via the image capture module, an image of a printed correlation mark;
identify a decoding template;
apply the template to detect hidden content within the printed correlation mark;

generate an enhanced image of the detected hidden content by:
  dividing the image into non-overlapping blocks,
  for each block, determining an average of an application of the template to pixels within the block,
  assigning a value of 1 to each pixel in any block for which the determined average is positive, and
  assigning a negative or zero value to each pixel in any block for which the determined average is negative or zero; and
output the enhanced image of the detected hidden content on the display.

28. A method of capturing and displaying hidden data in a correlation mark, the method comprising:
by a processor of an electronic device:
  receiving an image of a correlation mark;
  identifying a decoding template;
  applying the template to detect hidden content within the correlation mark;
  generating an enhanced image of the detected hidden content by:
    dividing the image into non-overlapping blocks,
    for each block, determining an average of an application of the template to pixels within the block,
    assigning a value of 1 to each pixel in any block for which the determined average is positive, and
    assigning a negative or zero value to each pixel in any block for which the determined average is negative or zero; and
  causing the enhanced image with the detected hidden content to be presented on a display of the electronic device.

29. A non-transitory computer-readable medium containing programming instructions configured to, when executed, cause a processor of an electronic device to:
receive an image of a correlation mark;
identify a decoding template;
apply the template to detect hidden content within the correlation mark;
generate an enhanced image of the detected hidden content by:
  dividing the into non-overlapping blocks,
  for each block, determining an average of an application of the template to pixels within the block,
  assigning a value of 1 to each pixel in any block for which the determined average is positive, and
  assigning a negative or zero value to each pixel in any block for which the determined average is negative or zero; and
cause the enhanced image with the detected hidden content to be presented on a display of the electronic device.

* * * * *